United States Patent [19]
Higgins

[11] Patent Number: 5,465,752
[45] Date of Patent: Nov. 14, 1995

[54] MULTI-FUNCTION VALVE FOR A RISER IN A SPRINKLER SYSTEM

[76] Inventor: Gary Higgins, 985 Capistrano, Laguna Beach, Calif. 92651

[21] Appl. No.: 206,406

[22] Filed: Mar. 7, 1994

[51] Int. Cl.[6] ............................................. F16K 17/30
[52] U.S. Cl. ............... 137/512.5; 137/513; 137/516.27; 137/517; 137/541; 137/614.21; 239/533.15; 239/571; 239/572
[58] Field of Search ................... 137/512.5, 513, 137/517, 516.27, 515.7, 541, 614.21; 239/200, 201, 533.15, 570, 571, 572

[56] References Cited

U.S. PATENT DOCUMENTS

| | | | |
|---|---|---|---|
| 693,133 | 2/1902 | Hennebohle | 137/614.21 X |
| 3,794,077 | 2/1974 | Fanshier | 137/541 X |
| 3,951,379 | 4/1976 | Cornelius | 239/570 UX |
| 4,131,235 | 12/1978 | Lieding | 137/512.5 X |
| 4,488,566 | 12/1984 | Hicks | 137/515.7 X |
| 4,736,889 | 4/1988 | Stephenson | 239/572 X |
| 4,842,198 | 6/1989 | Chang | 137/517 UX |

*Primary Examiner*—Robert G. Nilson

[57] ABSTRACT

A multi-function valve for installation in a riser of a sprinkler system provides two valve functions. One function is to stop flow automatically when breakage of a sprinkler head causes the flow rate to exceed a predetermined threshold. The second function is to prevent back flow and reduce the risk of the "hammer effect" causing damage to the sprinkler system.

8 Claims, 4 Drawing Sheets

MULTI-FUNCTION VALVE FOR A RISER IN A SPRINKLER SYSTEM

BACKGROUND OF INVENTION

1. Field of the Invention

In general, this invention relates to components for a sprinkler system; more particularly, it relates to a valve that installs in a riser of a sprinkler system and provides two valve functions: one being to stop flow automatically when breakage of a sprinkler head causes the flow rate to exceed a predetermined threshold; and the other being to prevent back flow and reduce the risk of the "hammer effect" causing damage to the sprinkler system.

2. Description of the Prior Art

Automatic sprinkler systems are widely used to irrigate lawns and landscape areas surrounding residential, commercial property, and in municipal parks, golf courses, and along highways.

Such a sprinkler system is designed to carry water under pressure through supply line piping into riser pipes which can be located above or below ground level and then through sprinkler heads or nozzles where the water flow is transformed into a desired spray. The size and number of sprinkler heads in a system depend upon available water pressure. Normally, the system is divided into irrigation zones consisting of a given number of sprinkler heads. The flow of water to these various zones is normally controlled by off and on manual or electronic solenoid valves which can be activated manually or by automatic timer controls.

In such a sprinkler system, the water supply lines are generally made of plastic or metal and conform to standard diameters such as ½", ¾" or 1."Plastic or metal tees or elbows are used to interconnect the supply lines. The tees and elbow connectors are connected to plastic or metal riser pipes through each of which a portion of the water flows to the sprinkler heads and nozzles which are available in different flow rates and irrigation spray and coverage patterns.

Two of the most costly and common problems that plague the operation of such a sprinkler system are referred to herein as the "broken riser" problem and the "hammer effect."

As for the broken riser problem, the costs attributable to this problem include the following. In addition to providing a means of controlling the spray pattern distribution of water, the nozzle orifices are sized in order to restrict the flow rate of the water in gallons per minute. If the sprinkler head is damaged or removed or the riser pipe is broken the flow restriction capability of the nozzle is also removed. Loss of the flow rate restriction feature results in an immediate virtually unrestricted flow of water at the damaged sprinkler. The flow rate at the damaged sprinkler head or riser is restricted only by the diameter of the remaining portion of the broken riser (typically ½", ¾" or 1" in diameter). A single broken riser or one with a missing sprinkler head can flow at rates from 30 to 100 gallons per minute depending upon the water pressure of the affected system. Undetected and unrestricted flow of water for thirty to forty minutes can result in the loss of 900 to 4,000 gallons of valuable water which in turn can cause extensive erosion, flooding and create the potential for damage, injury and loss of life and property if the water is projected into traffic onto near by streets and highways by the geyser or high pressure fountain effect.

In addition, damage to the sprinkler head or riser always results in an immediate substantial drop in water pressure in the other sprinkler heads on the supply line in that zone and renders them ineffective. Costly emergency repairs are often required and the entire system must be shut down in order to repair and or replace the damaged components or until time and available parts can be obtained to make the necessary repairs. Loss of irrigation even for a couple of days can result in the loss of valuable lawns or water dependent landscaping due to lack of moisture.

As for the "hammer effect" problem, this is a problem which may ultimately cause failure of an entire sprinkler system. The "hammer effect" is a result of back flow at the end of an irrigation cycle when the water is turned off. When the water is turned off the water remaining in the system drains to the lowest point in the line and fills the supply line with air, when the water is turned on during the next irrigation cycle water flows under pressure into the supply line forcing the air trapped in the system out and at the precise moment that the air is purged from the supply line the resulting in a momentary high pressure shock known as the "hammer effect" and produces high stress pressure on the entire branch of the supply lines and sprinkler heads. This event is created every time the water is turned on in the system. Eventually the "hammer effect" which severely stresses the entire system will lead to damage of the supply lines resulting loss of irrigation capacity for a period of time and expensive repairs or replacement.

A prior art patent that describes the "broken riser" problem is U.S. Pat. No. 4,842,198 (the '198 patent). The '198 patent describes a device that is installed between a distribution tee and a riser. The device of the '198 patent appears to be intended to provide a single valve that turns off automatically in response to a pressure drop change, and do so under control of a damping force caused by a dashpot. Although the filing date of the '198 patent is more than six years ago, the "broken riser" problem has not been solved by any commercialized device, and the "hammer effect" problem likewise has not been adequately addressed.

SUMMARY OF THE INVENTION

The present invention provides a valve for installation in a riser of a sprinkler system to provide both automatic flow stop and back flow prevention. The valve comprises a main body and means for securing the main body in a fixed position within the riser. Preferably, the main body has a generally cylindrical portion and the securing means comprises a circumferential flange projecting from the body such that the flange can be placed between, and held in place by, the bottom of a riser and the top of a connector such as a tee. The main body has an inlet end which defines a flow-stop valve seat, an outlet end which defines a back-flow valve seat, a bore extending between the inlet and outlet ends, and channel means defining a flow path for water flow during normal sprinkling operations. In a preferred embodiment in which the main body includes a generally cylindrical portion, the above-mentioned bore is located at the axis of such portion, and the channel means comprises a plurality of channels extending in parallel between the inlet and outlet ends.

The valve further includes a shaft which extends through the bore and which is movable between opposite end positions; a pair of annular members fixed to shaft at spaced-apart locations such that translatory motion of the shaft toward the outlet end causes one of the annular members to be moved into abutment with the flow-stop valve seat and close the flow-stop valve, and such that translatory motion of the shaft toward the inlet end causes the other annular member to be moved into abutment with the back-flow valve seat and close the back-flow valve.

The valve further includes a spring surrounding the shaft, the spring having opposite ends. The main body has a surface bearing against one end of the spring, and one of the annular members bears against the opposite end of the spring. The spring has a spring constant such that the spring is forced into limited compression in the presence of normal water flow though the flow path, and such that an abnormally high flow rate causes sufficient compression that the flow-stop valve closes.

The foregoing and additional novel and advantageous features of the invention are described in detail below and set forth in the appended claims.

BRIEF DESCRIPTION OF THE DRAWINGS

FIG. 4 comprises FIGS. 4A, 4B, and 4C, in which

DETAILED DESCRIPTION OF THE PREFERRED EMBODIMENT

Figure 1:
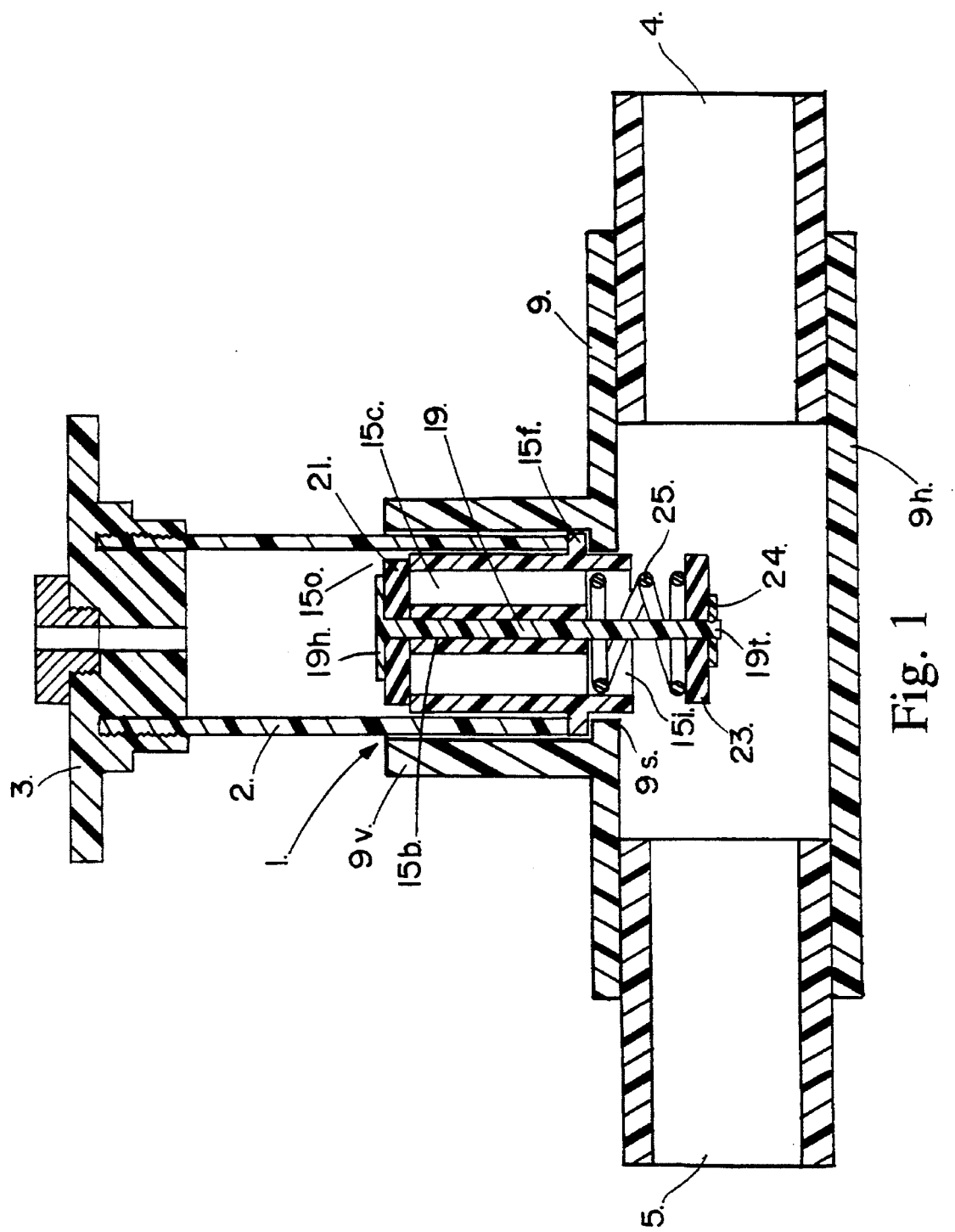
FIG. 1 is a sectional side view, showing a preferred embodiment of a multi-function valve in accord with this invention, with the valve being shown as installed in a tee and riser section of a sprinkler system.
Figure 2:
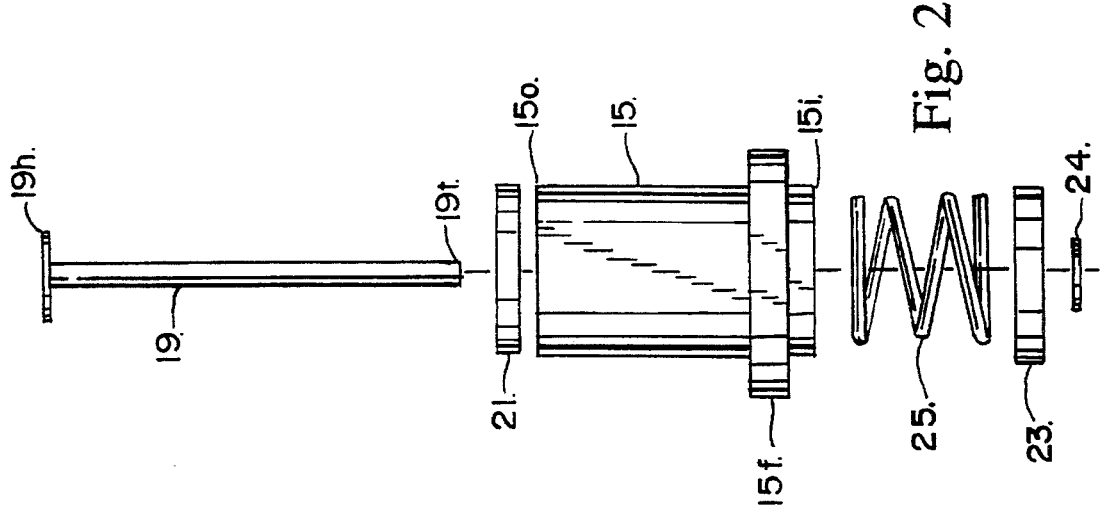
FIG. 2 is an exploded view of the preferred embodiment of the multi-function valve.

In FIG. 1, a preferred embodiment of a multi-function valve (generally indicated at 1) in accord with this invention is shown as installed in a riser 2 of a sprinkler system. At the upper end of riser 2, a sprinkler head 3 is provided to cause water flowing through its orifices to be projected in a desired spray. Water is supplied in the sprinkler system by a water supply line comprising in-line pipes 4 and 5. A conventional tee connector has a horizontally extending portion 9$h$ and a vertically extending portion 9$v$. Each of the pipes 4 and 5 has external threads to thread into internally threaded opposite ends of the horizontally extending portion 9$h$, and riser 2 likewise has external threads to thread into internally threaded end of vertical portion 9$v$. The vertically extending portion 9$v$ has a conventional circular shoulder portion 9$s$, which normally provides a stop against which the bottom of a riser is pressed during installation of the riser.

Figure 3:
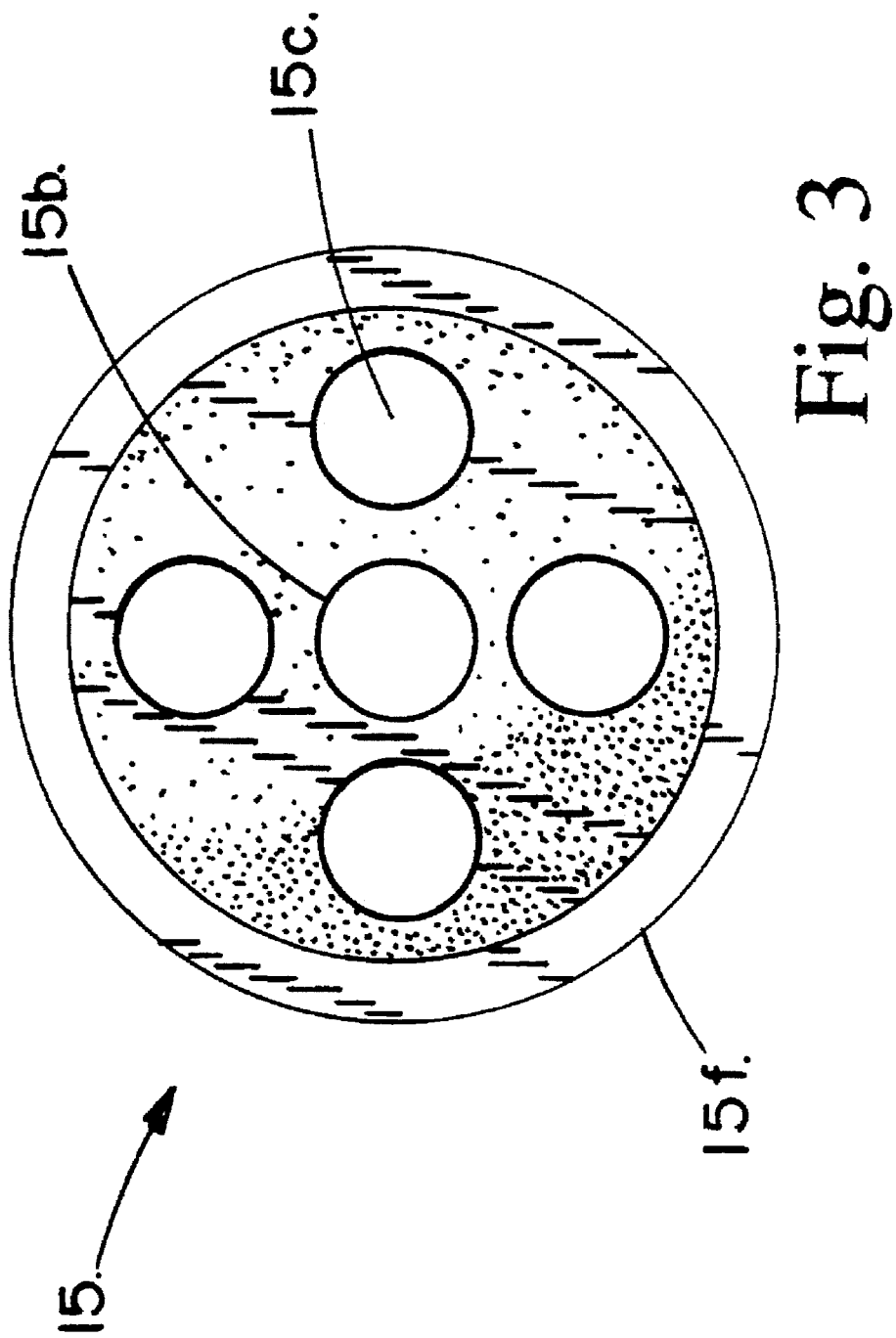
FIG. 3 is a top plan view of the main body of the preferred embodiment of the multi-function valve.

The multi-function valve 1 a main body 15 and means for securing the main body in a fixed position within the riser 2. Preferably, the main body includes a portion that defines a generally cylindrical outer surface, and internal surfaces that define, as seen best in FIG. 3, an axially extending bore 15$b$ and a plurality of parallel channels 15$c$. Preferably, the securing means comprises a circumferential flange 15$f$ projecting from the body such that the flange 15$f$ can be placed between, and held in place by, the bottom annular surface of the riser 2 and the top annular surface of shoulder portion 9$s$ of the tee.

The main body has an inlet end 15$i$ which defines a flow-stop valve seat, an outlet end 15$o$ which defines a back-flow valve seat. The bore 15$b$ (FIG. 3) extends between the inlet and outlet ends, and the channel means 15$c$ (FIG. 3) define a flow path for water flow during normal sprinkling operations. Preferably, the main body 15 is made from injection-molded nylon.

Figure 4C:
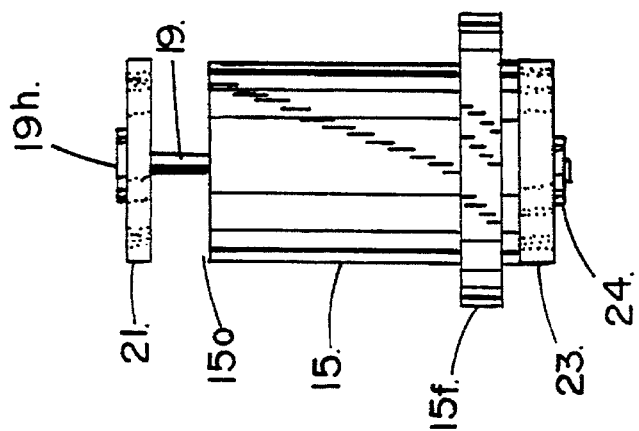
FIG. 4C shows the multi-function valve as it operates with the flow-stop valve closed and the backflow valve opened.
Figure 4B:
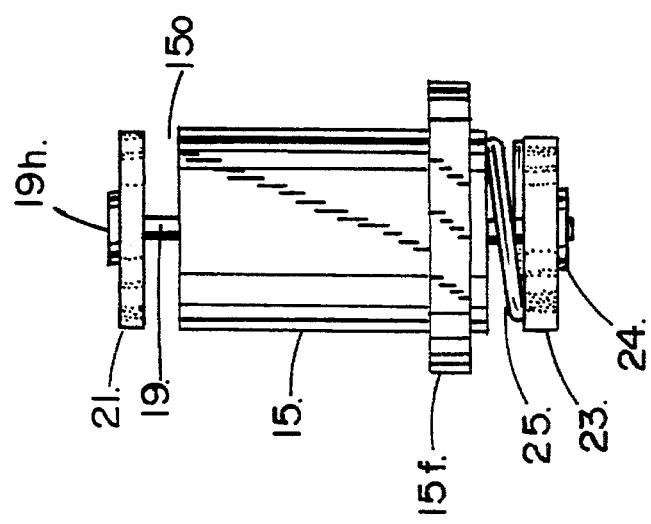
FIG. 4B shows the multi-function valve as it operates with both the backflow valve and the flow-stop valve opened.
Figure 4A:
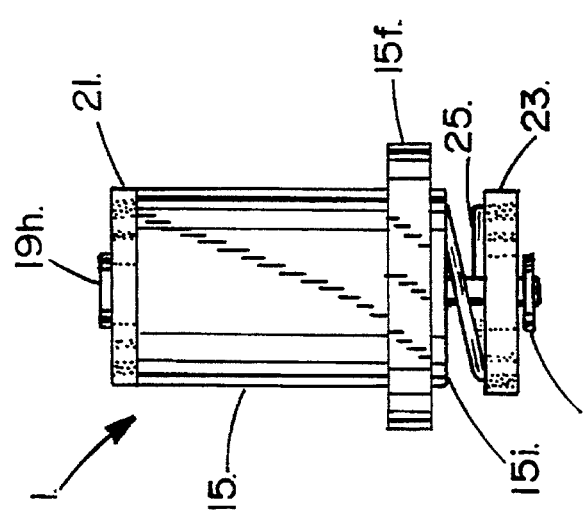
FIG. 4A shows the multi-function valve as it operates with the backflow valve closed and the flow-stop valve opened.

The multi-function valve 1 further includes a shaft 19 which extends through the bore 15$b$. The shaft 19 has a head portion 19$h$ at one end and a threaded portion 19$t$ at the opposite end. Preferably, the shaft 19 is made of injection-molded nylon. The shaft 19 is movable between opposite end positions. One such opposite end position is illustrated in FIG. 4A, and the other opposite end position is illustrated in FIG. 4C. The multi-function valve 1 further includes a pair of annular members 21 and 23, each of which is friction-fitted to the shaft 19. The upper surface of the annular member 21 bears against the lower surface of the head portion 19$h$ of the shaft. An internally threaded annular nut-like member 24 is threaded onto the threaded portion 19$t$ of the shaft 19. The lower surface of annular member 23 bears against the upper surface of the member 24.

In operation, the annular members 21 and 23 remain at spaced-apart locations such that translatory motion of the shaft toward the outlet end 15$o$ causes the annular member 23 to be moved into abutment with the flow-stop valve seat and close the flow-stop valve, and such that translatory motion of the shaft toward the inlet end 15$i$ causes the annular member 21 to be moved into abutment with the back-flow valve seat and close the back-flow valve.

The multi-function valve 1 further includes a spring 25 surrounding the shaft 19, the spring having opposite ends. The main body 15 has a lower portion bearing against one end of the spring 25. The annular member 23 bears against the opposite end of the spring 25. The spring 25 has a spring constant such that the spring is forced into limited compression in the presence of normal water flow though the flow path (as illustrated in FIG. 4B), and such that an abnormally high flow rate causes sufficient compression that the flow-stop valve closes (as illustrated in FIG. 4C). Preferably, the spring 25 is made of stainless steel. For a valve sized for use in a one-half inch diameter riser, the spring preferably is three turn wire having a diameter of 0.03 inches. The spring constant of such a spring, when used with an annular member 23 having approximately 7/16" diameter, is such that 7½ pounds of pressure drop across the valve 1 causes approximately ¼" compression of the spring.

The combined compression and extension ratios of the selected spring provide the means to control the range of motion of the shaft and the back flow prevention and flow stop valves. The valve, with no water flow, allows the selected rating of the extension spring to move the shaft, back flow prevention valve, and the flow stop valve in a downward direction and closes the back flow prevention valve against the back flow prevention seat. If the water pressure exceeds the selected compression rating of the spring, as would happen in the event of damage to the sprinkler head or riser, the increased water flow rate and subsequent pressure of the water driving against the bottom of the back flow prevention valve will exert sufficient pressure to compress the spring and move the flow stop valve and shaft upward against the flow stop valve seat and into the water shut off mode. The entire sequence happens simultaneously when the water flow rate and pressure exceeds the normal flow rate of the sprinkler head and the compression rating as measured in pounds of pressure on the spring. The flow stop valve of the device once closed is held in the closed position by means of the continuous water pressure exerted from the supply line to the bottom of the flow stop valve which in turn maintains constant compression against the spring until the water is turned off.

The extension rating of the selected spring moves the flow stop valve and shaft downward and automatically resets to the open position and with the downward movement of the shaft the back flow prevention valve moves to the closed position against the top of the main body or back flow valve seat when water pressure in the supply line is turned off or when the water pressure exerted to the bottom of the flow stop valve is reduced to less than the extension rating of the spring.

To make the valve 1, the annular member 21 is first friction fit on the shaft 19 at the upper end, just below the head portion 19h. The shaft 19 is then pushed through the axial bore 15b of the main body 15. The spring 25 is then placed so as to coil around the lower portion of the shaft 19. Finally, the annular member 23 is friction-fitted to the shaft and the annular member 24 is threaded onto the threaded portion 19t of the shaft 19.

To install the valve 1, it is inserted into the base opening of the riser 2. Then, the riser 2 is attached to the connector tee 9 and the sprinkler head 3 is attached to the top of the riser 2. Water is supplied by the water supply lines 4 and 5. The riser 2 is attached either by means of threads or by slip connection held in place by using plastic cement.

The foregoing demonstrates that the present invention provides a multi-function valve for installation in a riser of a sprinkler system to provide both automatic flow stop and back flow prevention. The automatic flow stopping feature turns off the flow of water in the event of damage to the sprinkler head or riser and ensures continued flow of water to the balance of the system without loss of pressure. The balance of the sprinkler system will continue to operate normally until repairs can be made, which greatly reduces the need for costly emergency repairs. Because the multi-function valve stops the flow of water to the affected sprinkler, the valve will eliminate costly flooding, erosion to soil surrounding the damaged sprinkler head and eliminate entirely the dangers of the geyser or high pressure fountain effect and greatly reduce the possibility of legal financial liability associated with accidents, property loss, and injury which can result from water being propelled into the traffic on streets and highways.

As for the back flow prevention feature, the multi-function valve will not interfere with the normal operation of the sprinkler system. Normal water pressure is utilized to overcome the selected rating of the extension spring and begins compression of the spring to a predetermined distance (as illustrated in FIG. 4B); such degree of distance being determined by the selected compression rating of the spring, and moves the shaft in an upward direction opening the back flow prevention valve of the device and under normal operating pressure also maintains the position of the flow stop-valve in the open mode.

Typically the automatic flow stop and back flow prevention valve is made in unique sizes for ½", ¾" or 1" riser pipes Of course, other sizes of automatic flow stop and back flow prevention valve can be provided for other size pipes. It should also be recognized that pipe is made of different materials, including different metals and plastics, and that the device may need to be different for different pipe construction, as well as for different sizes. An alternative embodiment of the invention involves integrating the valve and the riser. That is, the circumferential flange can be made integral with the riser. While the invention was developed to be used for water irrigation the dimensions of the automatic flow stop and back flow prevention device can be varied to provide different applications and for fluids other than water.

One unique advantage available with the unitary molded main body and small number of component parts is that the body fabricated from plastic can be made in different colors which is used to distinguish different sizes and pressure ratings. The device will not interfere with the normal operation of the sprinkler head or system.

I claim:

1. A valve for installation in a riser of a sprinkler system to provide both automatic flow stop and back flow prevention, the valve comprising:

a main body having a generally cylindrical portion;

means comprising a circumferential flange projecting from the body for securing the main body in a fixed position within the riser;

the main body having an inlet end which defines a flow-stop valve seat, an outlet end which defines a back-flow valve seat, means defining a bore extending between the inlet and outlet ends, and channel means in parallel with the bore defining a flow path for water flow during normal sprinkling operations;

a shaft which extends through the bore and which is movable between opposite end positions;

a pair of annular members fixed to shaft at spaced-apart locations such that translatory motion of the shaft toward the outlet end causes one of the annular members to be moved into abutment with the flow-stop valve seat and close the flow-stop valve, and such that translatory motion of the shaft toward the inlet end causes the other annular member to be moved into abutment with the back-flow valve seat and close the back-flow valve;

a spring surrounding the shaft, the spring having opposite ends;

the main body having a surface bearing against one end of the spring, one of the annular members bearing against the opposite end of the spring;

the spring having a spring constant such that the spring is forced into limited compression in the presence of normal water flow though the flow path, and such that an abnormally high flow rate causes sufficient compression that the flow-stop valve closes.

2. A valve as defined in claim 1 wherein the outwardly projecting flange has an annular shape so that it fits between the lower surface of a riser and the upper surface of a shoulder.

3. A valve as defined in claim 1 wherein the shaft has a head portion at one end and a threaded portion at its opposite end, and wherein the valve further includes a nut-like member that threads onto the threaded end of the shaft.

4. A valve as defined in claim 3 wherein one of the annular members is positioned between the spring and the nut-like member.

5. A valve as defined in claim 1 wherein the main body and the retaining means constitute a unitary plastic member.

6. A valve as defined in claim 5 wherein the main body is generally cylindrical and the bore therethrough extends axially and the shaft is freely movable within the axial bore.

7. A valve as defined in claim 1 which is made to fit into a selected one of standard size risers including risers having ½", ¾" and 1" diameters.

8. A valve as defined in claim 7 wherein the main body is fabricated from plastic and unitary molded and is made in a selected one of a variety of colors to distinguish different sizes and pressure ratings.

* * * * *